US009250872B2

(12) United States Patent
Sullivan et al.

(10) Patent No.: US 9,250,872 B2
(45) Date of Patent: Feb. 2, 2016

(54) TASK FLOW INTERFACE IN A POPUP REGION

(75) Inventors: Blake Sullivan, Redwood City, CA (US); Dave Schneider, Aurora, CO (US); Gary Van Matre, Littleton, CO (US); Pavitra Subramaniam, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 59 days.

(21) Appl. No.: 13/277,198

(22) Filed: Oct. 19, 2011

(65) Prior Publication Data
US 2013/0104067 A1    Apr. 25, 2013

(51) Int. Cl.
*G06F 9/44*     (2006.01)
(52) U.S. Cl.
CPC .................................. *G06F 8/38* (2013.01)
(58) Field of Classification Search
CPC ......... G06F 3/048; G06F 3/0486; G06F 7/00; G06F 17/30557; G06F 8/34; G06F 9/4443; G06Q 10/06; G06Q 30/06; G06Q 10/0633; G06Q 10/103
USPC ......................................... 715/804, 791, 797
See application file for complete search history.

(56) References Cited

U.S. PATENT DOCUMENTS

| 5,226,117 | A | * | 7/1993 | Miklos | 715/853 |
| 5,999,911 | A | | 12/1999 | Berg et al. | |
| 6,286,129 | B1 | | 9/2001 | Agarwal et al. | |
| 6,430,538 | B1 | | 8/2002 | Bacon et al. | |
| 6,845,369 | B1 | * | 1/2005 | Rodenburg | 1/1 |
| 2005/0090924 | A1 | | 4/2005 | Hsu et al. | |
| 2007/0282660 | A1 | | 12/2007 | Forth | |
| 2009/0094552 | A1 | * | 4/2009 | Watson et al. | 715/804 |
| 2009/0125833 | A1 | * | 5/2009 | Abernethy et al. | 715/779 |
| 2009/0319922 | A1 | * | 12/2009 | Nooka et al. | 715/760 |
| 2013/0185240 | A1 | * | 7/2013 | Ward et al. | 706/47 |

OTHER PUBLICATIONS

Siebel Business Process Framework: Task UI Guide, Version 8.0, Dec. 2006 http://download.oracle.com/docs/cd/B40099_02/books/PDF/BPFWorkflow.pdf.
QPR Process Guide BPMN Modeling Guide, Version 7.6.1, 2007 http://www.inst-informatica.pt/servicos/informacao-e-documentacao/biblioteca-diqital/giestao-de-si-ti-1/bpm/QPR%20ProcessGuide%20-%20BPMN%20Modeling%20Guide.pdf.

* cited by examiner

*Primary Examiner* — Jennifer To
*Assistant Examiner* — Terri Filosi
(74) *Attorney, Agent, or Firm* — Kilpatrick Townsend & Stockton LLP (57) ABSTRACT

In one set of embodiments, methods, systems, and apparatus are provided that include presenting, by a computer system, a task flow in a popup component of an application user interface executing in a user interface layer, where the task flow executes in an application layer of the computer system, and also include communicating, by the computer system, a first notification from the application layer to the user interface layer in response to normal completion of the task flow, and updating, e.g., closing, the component in the application user interface based upon the first notification. A second notification may be communicated from the user interface layer to the application layer in response to a user interface event that is associated with the popup component and causes an abnormal termination of the task flow. Presenting may include displaying the task flow in a region component in the popup component.

16 Claims, 9 Drawing Sheets

TASK FLOW INTERFACE IN A POPUP REGION

BACKGROUND

Embodiments of the present invention relate generally to computer-based applications, and more particularly to techniques for presenting features of such applications in user interfaces.

In general, an Application Development Framework (ADF) simplifies development of applications by providing re-usable components and integrated development environments, which application developers can use to define user interfaces and application logic by, for example, selecting components to perform desired tasks and defining the appearance, behavior, and interactions of the selected components. Because of the need for flexibility to support many different usage scenarios, the components may work well in certain commonly-used or relatively simple configurations, but not as well in less-common configurations. For example, components that support execution of tasks in business processes may have a requirement that the tasks execute on the same server computer. Although a workaround may be possible to allow some of the tasks to execute on a different server, the workaround may involve relatively complex and time-consuming customization of the task component configurations by the application developer, e.g., by specifying particular metadata values for each task, and/or adding additional components to the application to support execution of the tasks on different servers, thereby partially defeating the ease-of-use features of the integrated development environment. Unfortunately, there is typically no way for developers to use certain components in applications without performing detailed configurations of those components, adding additional support components, and/or implementing program code or logic to achieve desired behavior of such components.

SUMMARY

In one or more embodiments, an application execution environment is configured to execute a bounded task flow presented in a region of an inline popup user interface component. The bounded task flow includes page fragments rendered using a "region" user interface component that encompasses a displayed task flow, with two-way interaction between the task flow and the inline popup. The bounded task flow of the application may be created using an integrated development environment, which may also be used to add a bounded task flow to a region component within the application.

In one or more embodiments, the task flow is executed in the application at runtime. The user interface of the task flow, including the user interfaces of the activities in the flow, are synchronized with and communicate with the implementation of the task activities. The implementation of the task activities is sometimes referred to herein as an application layer or a business layer, as the implementation may involve business logic.

In one or more embodiments, activation and execution of the activities in the task flow are deferred until the popup is displayed, so that the task flow will appear to begin executing when the popup window appears. A two-way communication path is established between the business application layer that hosts the task flow and the user interface layer that hosts the popup components so that the user interface layer can send notifications to the business application layer in response to user interface events that affect the business application layer.

In one example, when the user interface receives a command to close or dismiss the popup, the user interface layer communicates a popup dismissal notification to the business application layer, and the business application layer can respond by indicating that the close operation is acceptable, in which case the business application layer can terminate the task flow and roll back any transactions that were in progress. Alternatively, the business application layer can respond by indicating that an action is to be taken, such as requesting confirmation from the user, and the result of the action is to be sent to the business application layer. Thus, if the user confirms the popup dismissal, the user interface layer communicates the confirmation to the business application layer, and the business application layer acts accordingly, e.g., by rolling back the transaction. If the user does not confirm the popup dismissal, then the user interface can cancel the popup dismissal and, optionally, notify the business application layer that the popup will not be dismissed.

In one or more embodiments, when the task flow ends normally, e.g., runs to completion, reaches an end state, or the like, such as when the user completes the activities in the flow, the business application layer communicates a task flow end notification to the user interface layer, and, upon receiving the notification, the user interface layer dismisses or closes the popup.

Embodiments of the present invention provide an application execution environment is configured to execute a bounded task flow presented in a region of an inline popup user interface component. A method is provided that includes presenting, by a computer system, a task flow in an application user interface, the application user interface executing in a user interface layer of the computer system, and the task flow executing in an application layer of the computer system, where the presenting comprises displaying the task flow in a region component and displaying the region component in a first popup component, the first popup component being displayed in a window of the application user interface. The method further includes communicating, by the computer system, a first notification indicating completion of the task flow from the application layer to the user interface layer in response to completion of the task flow, receiving, by the computer system at the user interface layer, the first notification, and updating, by the computer system, the first popup component in the application user interface in response to receiving the first notification.

Embodiments may include one or more of the following features. The updating may include closing the first popup component. The first popup component may overlay at least a portion of the application user interface, and the method may further include presenting, by the computer system, a second task flow in a second popup component, where the second popup component overlays the first popup component in the application user interface. The first and second popup components may be presented in different regions. The task flow may be a bounded task flow having defined start and end portions. The task flow may include one or more page fragments, and the presenting may include rendering the one or more page fragments in the region component. The method may further include receiving, by the computer system at the user interface layer, a user interface event that indicates a request to close the first popup component, communicating, by the computer system, a second notification indicating the request to close the popup component from the user interface layer to the application layer in response to receiving the user interface event, receiving, by the computer system at the application layer, the second notification, and executing, by the computer system, an action in the application layer in response to receiving the second notification. Executing the action may include rolling back and terminating the task flow and/or communicating, by the computer system, a third notification indicating uncommitted transaction data from the application layer to the user interface layer. The method may further include receiving, by the computer system in the user interface layer, the third notification indicating uncommitted transaction data, causing display, by the computer system, of a confirmation dialog in the user interface layer in response to receiving the third notification indicating uncommitted transaction data, receiving, by the computer system, a user response to the confirmation dialog in the user interface layer, where the user response indicates that the uncommitted transaction data is to be saved, communicating, by the computer system, the user response to the application layer, receiving, at the application layer, the user response, causing, by the computer system at the application layer, the uncommitted data to be saved in response to the user response, and rolling back and terminating, by the computer system at the application layer, the task flow.

According to another embodiment, a computer system is provided. The computer system includes a processor configured to present a task flow in an application user interface, the application user interface executing in a user interface layer of the system, and the task flow executing in an application layer of the system, the task flow being displayed in a region component, the region component being displayed in a first popup component, and the first popup component being displayed in a window of the application user interface. The processor is further configured to communicate a first notification indicating completion of the task flow from the application layer to the user interface layer in response to completion of the task flow, receive, at the user interface layer, the first notification, and update the first popup component in the application user interface in response to receiving the first notification, wherein the task flow is a bounded task flow having defined start and end portions.

According to another embodiment, a machine-readable medium for a computer system having stored thereon a series of instructions executable by a processor is provided. The instructions include instructions that cause the processor to present a task flow in an application user interface, the application user interface executing in a user interface layer of the system, and the task flow executing in an application layer of the system, the task flow being displayed in a region component, the region component being displayed in a first popup component, and the first popup component being displayed in a window of the application user interface. The instructions further include instructions that cause the processor to communicate a first notification indicating completion of the task flow from the application layer to the user interface layer in response to completion of the task flow, instructions that cause the processor to receive, at the user interface layer, the first notification, instructions that cause the processor to update the first popup component in the application user interface in response to receiving the first notification, where the task flow is a bounded task flow having defined start and end portions, and the task flow includes one or more page fragments, and instructions that cause the processor to render the one or more page fragments in the region component.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
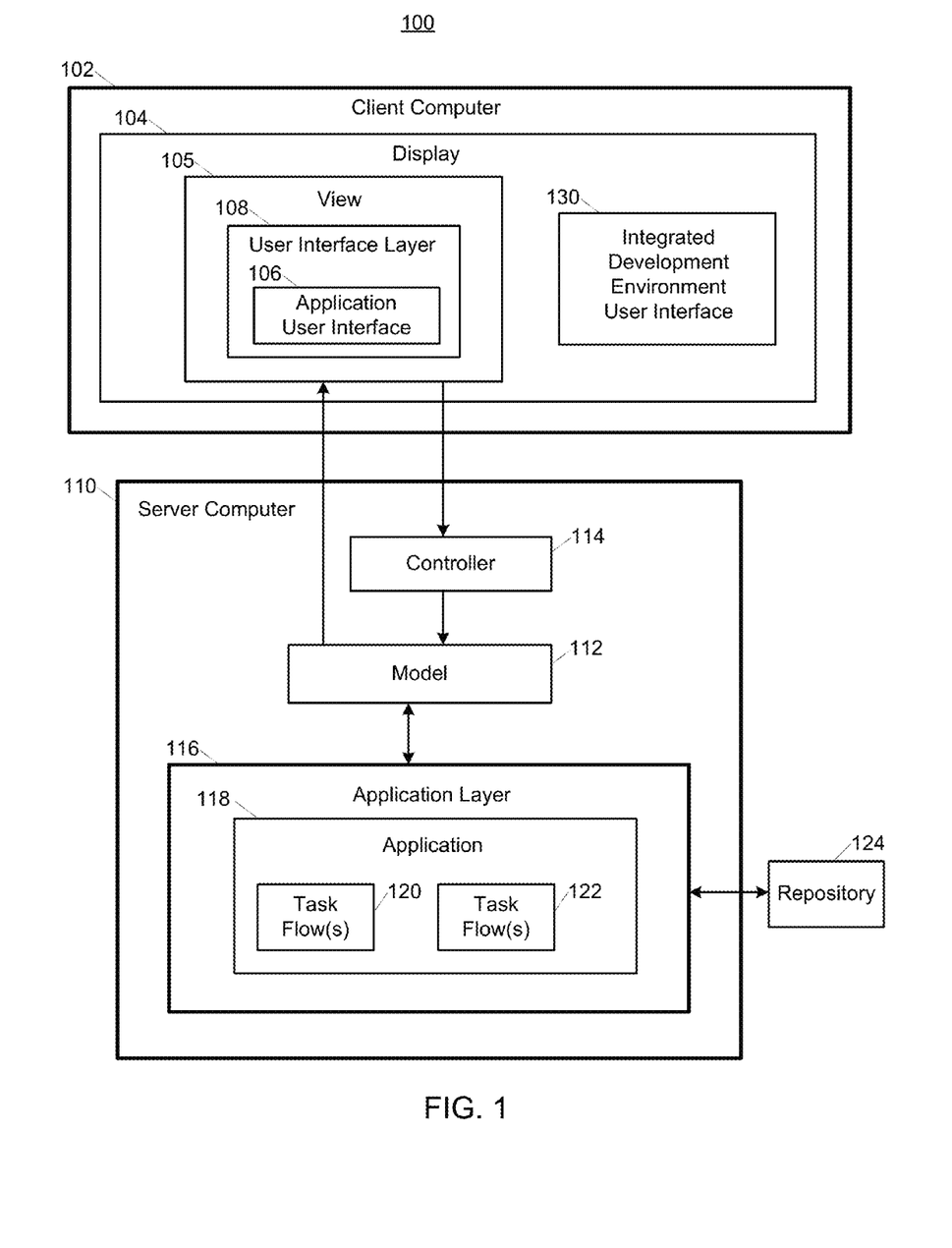
FIG. 1 is a simplified block diagram of an application development and execution system according to an embodiment of the present invention.

FIG. 1 is a simplified block diagram of an application development and execution system 100 according to an embodiment of the present invention. The system 100 facilitates development of applications using an integrated development environment (IDE) 130 and execution of the applications using an execution engine or the like (not shown). The system 100 may be a software system, a hardware system, an enterprise system, or the like. For example, the system 100 may be a complex enterprise software system and may include a database system and related products provided by Oracle Corporation™ of California. The system 100 may be implemented using, for example, the Oracle Fusion web technology stack. Applications created using the Fusion web technology stack can achieve a clean separation of business application logic, page navigation, and user interface by adhering to a model-view-controller ("MVC") architecture. In an MVC architecture, a model layer 112 represents the data values related to a current user interface page, a view layer 105 contains the user interface pages used to view or modify that data, and a controller layer 114 processes user input and determines page navigation. A business application service layer, which is represented as an application layer 116, handles data access and encapsulates business logic. As depicted in FIG. 1, the system 100 comprises a client computer 102, which has a display device 104 on which an application user interface 106 that uses a user interface layer 108 can be displayed. The IDE 130 may be, for example, JDeveloper, available from Oracle® Corporation, or the like.

The system 100 also comprises a server computer 110 on which the application layer 116 and the application 118 can execute. The application 118 may be, for example, an Oracle Application Development Framework ("ADF") application, or the like. The application 118 may include one or more task flows 120. Each task flow 120 is structured as a sequence of tasks, which are also referred to herein as activities, that are executed as part of the task flow 122. In one aspect, the task flows 120 can call, i.e., invoke, other task flows 122. Data related to the application layer 116, including design-time representations of the application 118, is stored in a repository 124, e.g., a database or the like. An application model 112 includes runtime data structures used by the application layer 116, and an application controller 114, e.g., program code or logic that controls the transitions between pages or screens of the user interface 106, may also execute on the server computer 110.

Figure 2:
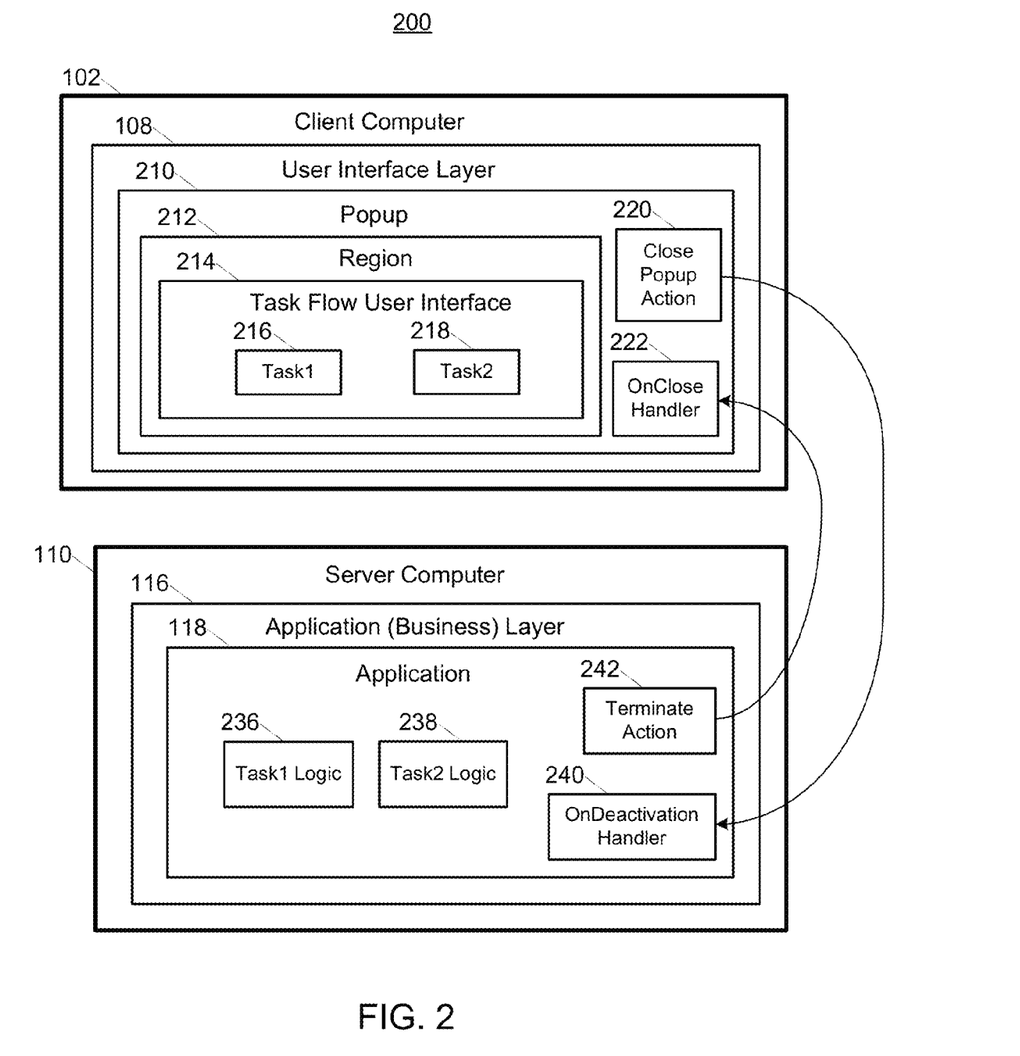
FIG. 2 is a simplified block diagram of a communication between a user interface layer and an application layer in an application execution system according to an embodiment of the present invention.

FIG. 2 is a simplified block diagram of communication between a user interface layer 108 and an application layer 116 in an application execution system 200 according to an embodiment of the present invention. As depicted in FIG. 2, the application execution system 200 comprises a client computer 102 and a server computer 110. The client computer 102 hosts a user interface layer, e.g., program code in the form of a library or framework that includes code used by one or more applications 118. The user interface layer 108 interacts with code of particular applications 118 to display application user interfaces in, for example, a web browser or standalone application. The user interface layer 108 creates, presents, and closes at least one popup (e.g., an inline popup 210) in accordance with the implementation of an application 118. The inline popup 210 is, in one example, a graphical region displayed in the application user interface in which images and text can be rendered. The inline popup 210 can appear overlaid on another portion of the user interface. The inline popup 210 can appear in the same window as the application in one or more embodiments, or in a separate window in other embodiments. The inline popup 210 can contain at least one region 212. The region 212 is not necessarily visible, e.g., not necessarily displayed or represented graphically. The region 212 may act as a grouping or containing entity for other user interface elements such as a task flow user interface 214. The task flow user interface 214, as described elsewhere herein, presents one or more task user interfaces, e.g., Task1 216 and Task2 218 user interfaces, which can be displayed in sequence as execution of the application 118 flows from Task1 216 to Task2 218. Although two tasks 216, 218 are shown for illustrative purposes, the task flow user interface 214 can present any number of task user interfaces in a sequence determined by the application 118. Since the task flow user interface 214 is displayed in the region 212, which is displayed in the inline popup 210, the task flow user interface 214 is presented by the user interface layer 108 on a display of the client computer 102 in accordance with the configuration of the popup inline 210, e.g., in the same window as the application user interface in one or more embodiments.

In one or more embodiments, the server computer 110 hosts an application layer 116 (also referred to herein as a business layer). The application layer 116 may be, for example, program code in the form of a library or framework that includes code shared by different applications. The application layer 116 interacts with one or more applications 118, each of which can be a design-time representation of the logic (e.g., business logic) of an application, defined, in one or more embodiments, by developers using the integrated development environment 130 as described with reference to FIG. 1. In other embodiments, the logic of the application 118 includes computer program code instructions created by application developers using other methods. Thus the application 118 can include definitions of task flows, as well as definitions and implementations of the behavior of particular tasks in the flows. Two example task implementations, Task1 Logic 236 and Task2 Logic 238, which implement Task1 216 and Task2 218, respectively, are shown in FIG. 2.

The server computer 110 executes the application 118 at runtime, thereby causing the Task1 Logic 236 and Task2 Logic 238 to execute in accordance with the application logic, e.g., in sequence as defined by a transition in the application logic that links Task1 216 to Task2 218. In one example, the Task1 Logic 236 executes first, causing the Task1 216 user interface to be displayed to the user inside a popup and region on the client computer 102. The user can then perform an action in the Task1 user interface to cause the Task2 Logic 238 to be executed and the Task2 user interface to be displayed inside a popup and region. In one example, when the application 118 starts a new task flow, the Task1 Logic 236 begins execution, and the application layer 116 communicates instructions to the user interface layer 108 on the client computer to display the task flow user interface 214 in the region 212 of the popup 210. Note that in one or more embodiments, the communication between the application layer 116 and the user interface layer 214 is indirect, e.g., the communication is triggered via notifications that are generated by one of the layers and received by at least one of the other layers. Thus, when a layer receives a notification, the layer receives related data from the other layer. In one or more embodiments, the application layer waits for the popup 210 containing the user interface of the task flow 214 and/or each task interface 216, 218 to be displayed before initiating execution of the corresponding task logic 236, 238. This wait operation can be implemented in the application layer by waiting for an acknowledgement from the user interface layer 108 that the popup is being displayed or is ready to be displayed.

In one or more embodiments, communication between the user interface layer 108 and the application layer 116 can continue while the application 118 executes. For example, when the task logic 236, 238 has completed execution, e.g., at the end of a transaction, or when an end task activity is reached, there is no further need for the task flow user interface 214 to be displayed, and the application layer 116 can communicate a notification to the user interface layer 108 indicating that the popup 210 can be closed. This notification can be implemented as a terminate action 242 that is invoked by the task logic 236, 238 when the task is complete, e.g., when a transaction has completed, or an end task activity is reached. The terminate action 242 can send the notification to the user interface layer 108 by, for example, invoking a program code function of the user interface layer 108, or sending an event to a notification queue monitored by the user interface layer 108, and notifying a synchronization object associated with the queue so that the user interface layer 108 will dequeue and process the notification in an OnClose handler 222, which can close the popup 210. If the user interface layer 108 and the application layer 116 are located on different computers, as may be the case in FIG. 2, then the notification can be sent between the client and server using a communication channel such as a network connection.

In another example, a user may issue a command to close the user interface window in which the popup 210 is displayed. However, closing the window immediately would leave the associated application task flow in a potentially incomplete state, unable to request and receive further information that may be needed to complete a pending transaction, for example. Therefore, when a user issues a window close command, the user interface layer 108 generates a close popup action notification 220 and sends the notification to the application layer 116. The notification can be sent between the application layer 116 and the user interface layer 108 using a communication mechanism such as those described above, such as a function call, an intra-process or inter-process shared memory communication, or an interprocess network communication. Upon receiving the close notification, the application layer 116 invokes an OnDeactivation handler 240, which can either shut down the task logic 236, 238, e.g., by rolling back any pending transactions, or can negotiate with the user interface layer 108, e.g., to request that the user interface layer 108 prompt the user to confirm that the window should be closed and the task should be terminated with possible loss of data (e.g., if there is no transaction to roll back). The application layer 116 can then receive the user's response from the user interface layer 108, and can either shut the task down, if the response was affirmative, or continue processing, if the response was negative.

Thus, in one or more embodiments, two-way communication is provided between the user interface component hosted inside the popup and the business application layer. A user can close the popup, e.g., by clicking on window close icon, which abruptly closes the window that hosts the popup and the task flow. Therefore, the user interface layer should communicate a notification or event to the business application layer indicating that the region is to be closed. The business application logic may either approve or deny the request to close the region. For example, if the task flow is executing a transaction, the business application logic may rollback the transaction and send an approval response to the user interface layer indicating that the region and window can be closed. Alternatively, if changes have been made to data via the user interface, and the changes will be lost if the operation is aborted, then the business application logic may send a response to the user interface layer indicating that the user interface layer should inform the user that the changes will be lost if the window or panel is closed, and request that the user confirm the close action. If the user confirms, the user interface layer may close the window and optionally communicate an indication that the user has closed the window to the business application layer. If the user does not confirm the close, then the user interface layer may abort the close operation and continue operation.

The integrated development environment (IDE) 130 can simplify creation of applications by providing a user interface in which a "design-time" representation of the application can be created by, for example, placing the desired application components on a canvas or panel that represents the application, configuring the components to perform desired activities, and connecting the components in a desired sequence. The design-time representation of the application can then be used by an execution engine to perform the desired activities. The time during which an application is being executed is referred to herein as "runtime."

Applications can be implemented as a sequence of tasks to be performed in a particular order, and such a sequence is represented by the task flow 120. An application developer can create a task flow 120 at design time using the IDE 130 to specify the activities to be performed, e.g., by placing corresponding action components in the design-time representation of the application. A task flow 120 is thus, in one aspect, an application component that includes one or more activities to be performed at runtime. If the task flow 120 includes more than one activity, the application developer can define a task flow logic by linking the activities in the task flow to specify the order and conditions in which the activities are to be executed at runtime. A particular type of activity, referred to as a view activity, includes one or more user interface components. When a task flow 120 is executed at runtime, activities are executed in sequence until the first view activity in the sequence is reached. The view activity is then presented to the user as a user interface. The user can interact with the user interface components of the view activity to cause control to be transferred to the next activity of the task flow 120 as defined by the task flow. The control flow causes activities to be executed in sequence until either the next view activity is reached or the termination of the task flow occurs. In one aspect, input parameters used to launch a task flow may be passed in automatically (according to an input parameter configuration) from the values on the base (i.e., invoking) page. Similarly, when a task flow 120 completes, the task flow can provide return parameters to be used on the invoking page or invoking task flow.

In one aspect, an application user interface 106 is displayed using graphical components such as windows, panels, text areas, input fields, dialog boxes, and the like. The user interface 106 can be displayed in, for example, a web browser window, an application window, or other type of visual display 104, and can receive input from the user via a keyboard or other input device. The user interfaces of the view activities can be defined and configured by the developer using the IDE 130, e.g., by placing the desired user interface elements on a canvas area that represents the application, and configuring properties of the elements. A view activity user interface may include components such as text to be displayed, input fields to receive information from a user, graphical images, and other types of user interface components. The application, including the task flow user interface 214 produced by the view activities, can be presented to a user for interaction with the user at runtime as a result of the execution engine executing the design-time representation. The view activities may display the user interfaces of the task flow in a window in the display 104 of FIG. 1. In one example, the task flow can be displayed in the same window as the application user interface 106 that contains and invokes the task flow, e.g., in a region 212 of a window that displays the application user interface 106. In another example, the task flow can be displayed in a separate window or dialog box that is distinct from the application window.

In one or more embodiments, an "inline popup" 210 is a user interface component that corresponds to a region 212 in the application user interface 106 and may overlay a portion of the application user interface 106 in the window. An inline popup 210 is, for example, a popup component that is configured with an inline flag set to true to cause the popup to appear in a specified window with other user interface components. A task flow user interface 214 can be displayed in the inline popup 210 if the design-time representation of the task flow is configured appropriately, e.g., by configuration settings established in the IDE 130. In one or more embodiments, application developers can use a page editor in the IDE 130 to create a task flow 120 to be run in an inline popup 210 in an application user interface 106 by placing a task flow component inside a popup component in the design-time representation of the application. An action can be configured to cause execution of the task flow by placing a component, such as a command component (e.g., a button or link) in the design-time representation of the application and using the integrated development environment to establishing an association, e.g., a flow connection, between the command component and the popup component.

Figure 3:
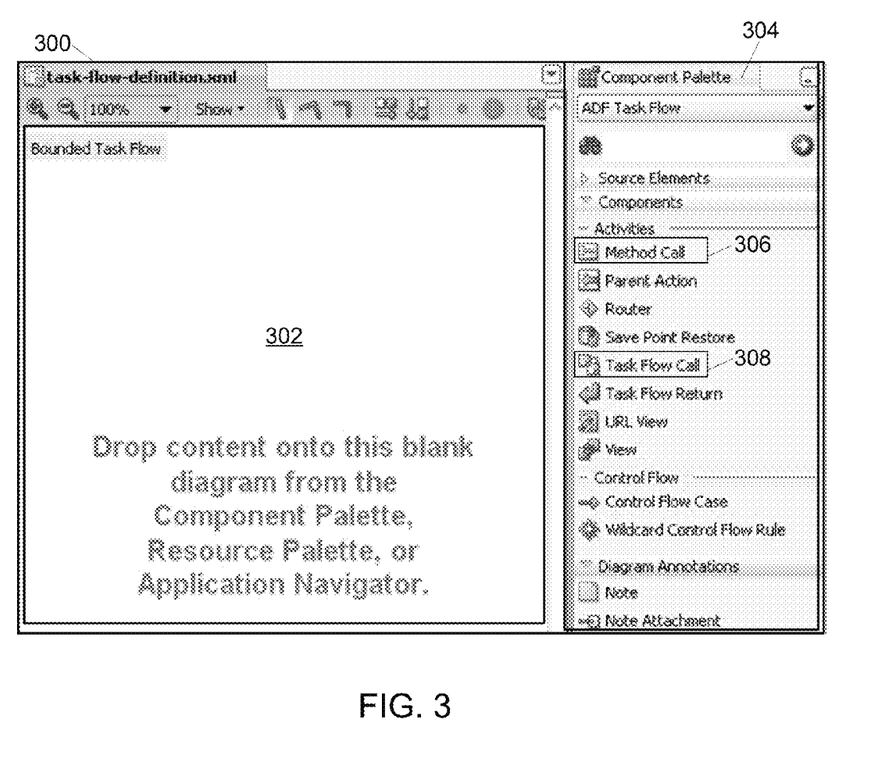
FIG. 3 illustrates an integrated development environment user interface that can be used in accordance with embodiments of the invention.

FIG. 3 illustrates an integrated development environment 300 user interface (IDE) that can be used in accordance with embodiments of the invention. The integrated development environment user interface 300 corresponds, in one example, to the IDE user interface 130 of FIG. 1. A developer can use the IDE 300, e.g., JDeveloper, available from Oracle® Corporation, or the like, to add a task flow to a region of an application. In one example, the IDE 300 can be used to create a bounded task flow 302 that consists of page fragments to be displayed in a region component that is itself displayed in an inline popup. As described above, a task flow includes a number of activities that implement the tasks, and can also include control flow rules that define transitions between those activities. The activities can include the view activities introduced above, which represent user interface pages, e.g., web pages, in the task flow, and method call activities 306, which call a method of operation, such as an operation to be performed before a page is rendered. Control flow rules are used between the activities. Task flow activities 308 can be used to call other task flows. The task flows that are called are ordinarily "bounded" task flows. A bounded task flow has a single entry point, any number of exit points, and private control flow rules, activities, and managed beans. A bounded task flow is an example of a task flow definition. A return activity can be used at the end of a bounded task flow to transfer control back to the flow that called this bounded task flow. A bounded task flow comprises of one or more view activities, each of which is associated with a specific page fragment. The region can then be associated with a bounded task flow statically (e.g., at design time). Alternatively, the task flow to run inside a region can be determined dynamically at runtime. Thus, the task flow to be run is determined at runtime in accordance with the region, so that the page fragment can be loaded at runtime and displayed to the user.

In one or more embodiments, to create a task flow in the IDE 300, a developer can select an Application Navigator, select (e.g., right-click) the project to contain the new task flow, and invoke a "New" command. Then, in a New Gallery, the user can expand a Web Tier, select JSF and then ADF Task Flow, and click OK. A dialog box 304 will appear in which the developer can set attributes of the task flow, including a bounded attribute, which the developer should check so that the task flow will be bounded. In one example, before creating an ADF region, a user creates a bounded task flow having one or more view activities associated with "page fragments" and create a page to host the ADF region. In one aspect, a page fragment is a Java Server Faces ("JSF") Java Server Page ("JSP") document (file extension .jsff) that renders as content in another JSF page. A page fragment does not contain any of the following tags: <af:document>, <f:view>, <f:form>, <html>, <head>, and <body>. These tags can only appear once in a document and do not support nesting in a JSF JSP page. For example, a page fragment embedded in a page does not include an <html> tag because the JSF JSP page already has one. After creating the bounded task flow, an ADF region can be created by dragging and dropping a bounded task flow that contains at least one view activity or one task flow call activity to the page where the ADF region is to be rendered. This operation is meant to ensure that the ADF region has content to display at runtime.

The developer or user then associates the bounded task flow's view activities with page fragments (e.g., .jsff documents). The context menu that the IDE 300 displays to create an ADF region presents options to create a non-dynamic and a dynamic region. A dynamic region (ADF dynamic region) determines the bounded task flow that it renders at runtime, whereas the bounded task flow to be displayed in a non-dynamic region (ADF region) is determined at design time. At this point, the bounded task flow is configured to be executed in the inline popup at runtime.

Figure 4:
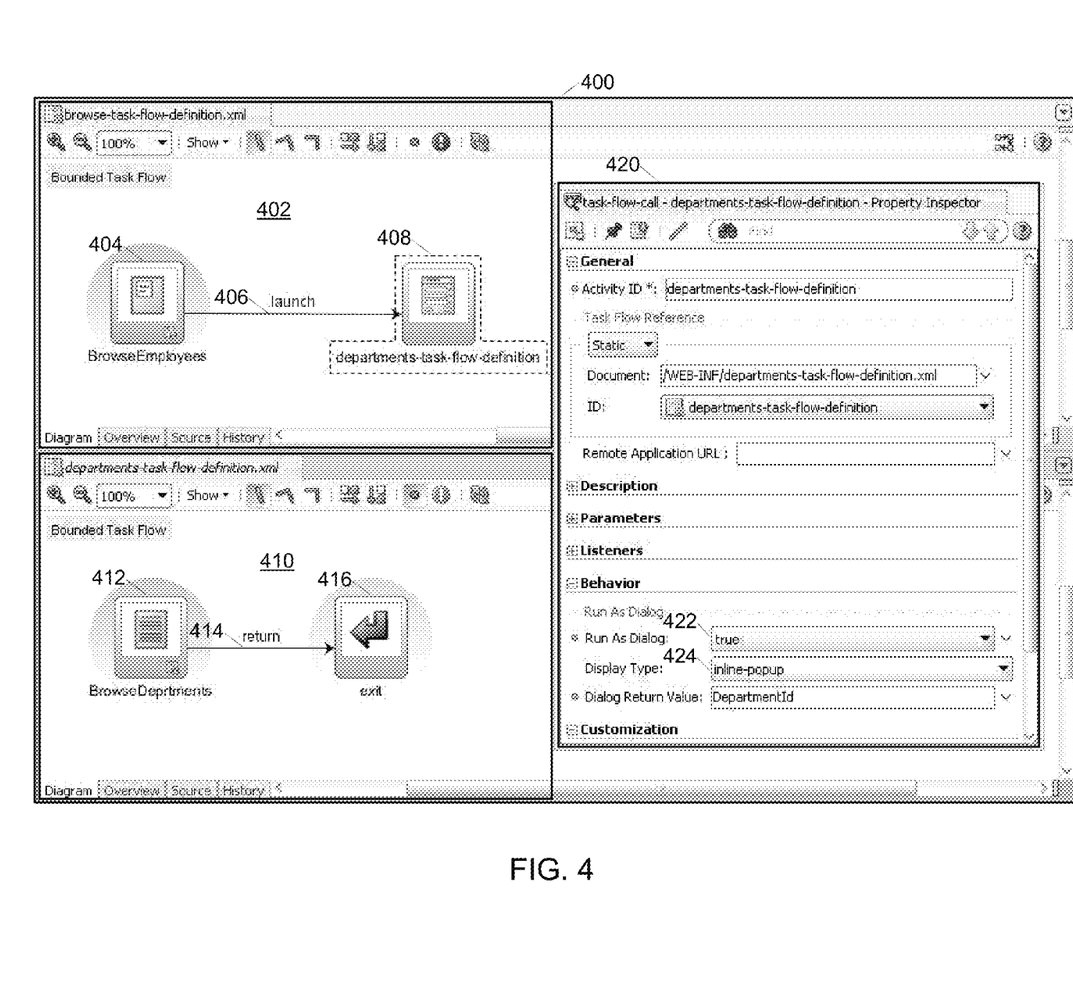
FIG. 4 illustrates task flows in a user interface of an integrated development environment that can be used in accordance with embodiments of the invention.

FIG. 4 illustrates task flows in a user interface of an integrated development environment (IDE) 400 that can be used in accordance with embodiments of the invention. The integrated development environment user interface 400 corresponds, in one example, to the IDE user interface 130 of FIG. 1. FIG. 4 shows design-time representations of two bounded task flows 402, 410 in the IDE user interface 400. The bounded task flows 402, 410 may be created as described in FIG. 3. In one aspect, the runtime appearance of the bounded task flows 402, 410 is different from the design-time appearance shown in FIG. 4. An example runtime appearance of a task flow is shown in FIG. 5.

Referring to FIG. 4, a first task flow 402, labeled browse-task-flow-definition.xml, includes a Browse Employees view activity 404 which the user interacts with, causing a control flow element 'launch' 406 to transition the task flow to another bounded task flow, departments-task-flow-definition.xml 408. The Property Inspector 420 shows the values of configuration properties of the call task activity 408, which include a Display Type property 424, which is set to "inline-popup." Previously, the call task activity 408 also included a Run as Dialog property 422, which was set to true to cause the call task activity 408 to be run in a dialog, e.g., an inline popup, and false to cause the call task activity 408 to be run in the same window as the calling task (i.e., not in a dialog). Previously, this property needed to be set to launch a bounded task flow in an inline popup. However, the use of the call task activity for this user interface configuration resulted in the business application layer being tightly coupled with the view layer. A user configuring business objects and task flows should not be concerned with user interface aspects of a task flow, i.e., how the bounded task flow will be launched. In accordance with embodiments of the invention, a user need not specify the 'Run As Dialog' property in the task flow definition to specify how the bounded task flow is to be launched, run, and displayed. Instead, in accordance with embodiments of the invention, a user can specify how a bounded task flow is to be launched as part of the user interface page configuration. For example, embodiments of the present invention enable the BrowseDepartments task 412 to be launched within a region user interface component inside an inline popup if the page configuration so specifies, leaving the business application layer to be concerned with business logic. The departments-task-flow-definition task flow 410 includes a browse departments activity 412, which, when selected at runtime allows a user to browse department information. When the BrowseDepartments activity is complete, e.g., the user has selected a done option or otherwise closed the BrowseDepartments activity, a transition 414 to a task exit activity 416 occurs, thereby returning control to the bounded task flow 402.

Figure 5:
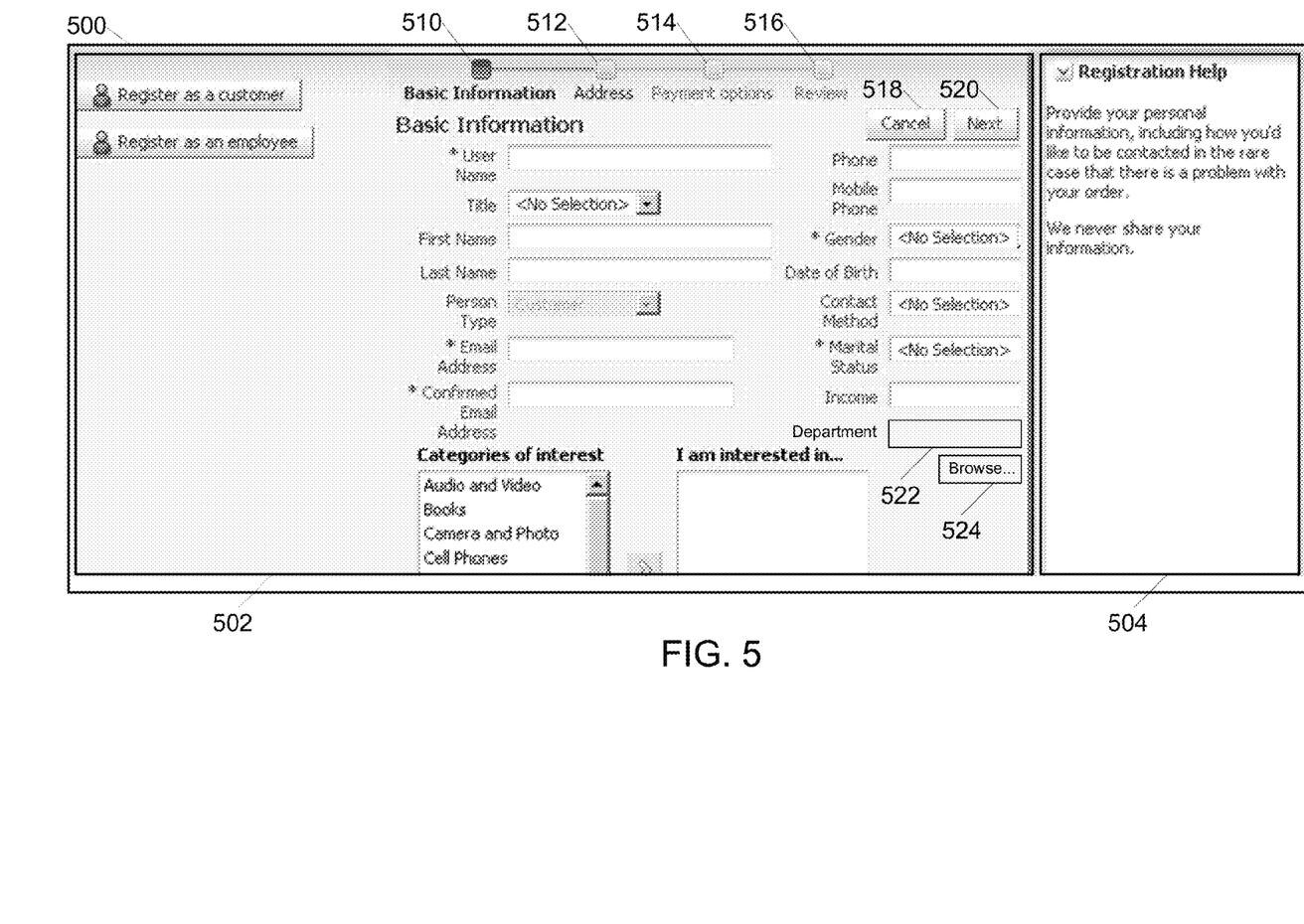
FIG. 5 illustrates an application user interface in accordance with embodiments of the invention.

FIG. 5 illustrates an application user interface 500 in accordance with embodiments of the invention. The application user interface 500 corresponds, in one example, to a portion of the application user interface 106 of FIG. 1. The application user interface 500 is displayed as an inline popup in an application user interface 106. The user interface 500 includes two regions 502, 504. The first region 502 displays a Basic Information task user interface 510, which includes a number of input fields for gathering information about a user. The Basic Information task user interface 510 also includes a Department field 522 and a Browse icon 524 located near the Department field. The user can select or click the Browse icon 524 to open the 'Browse Departments task flow' user interface as a region inside an inline popup. The Browse Departments task flow can then provide a value for the Department field 522. Further, task flows can be nested. For example, the BrowseDepartments task flow can launch another task flow, such as a CreateDepartments task flow that allows a user to create new departments. A user interface of the CreateDepartments task flow can be displayed within a second inline popup overlaid on top of the first inline popup. The Basic Information task user interface 510 is the first task in the flow, as can be seen by the shaded Basic Information task indicator 510, which is the first indicator on a horizontal line that represents the task flow. A Next button 520 can be selected by the user to cause the next task to execute. In this case the next task is an Address task represented by the Address indicator 512. A cancel button 518 can be selected by the user to cause the Basic Information task 510, and the task flow that contains the task 510, to be canceled. Other tasks in the flow include a Payment options task 514 and a Review task 516, the details of which are not shown. The second region 504 displays Registration Help text and can remain displayed while the user interface displayed in the first region 502 changes to display the user interfaces of the different tasks.

Figure 6A:
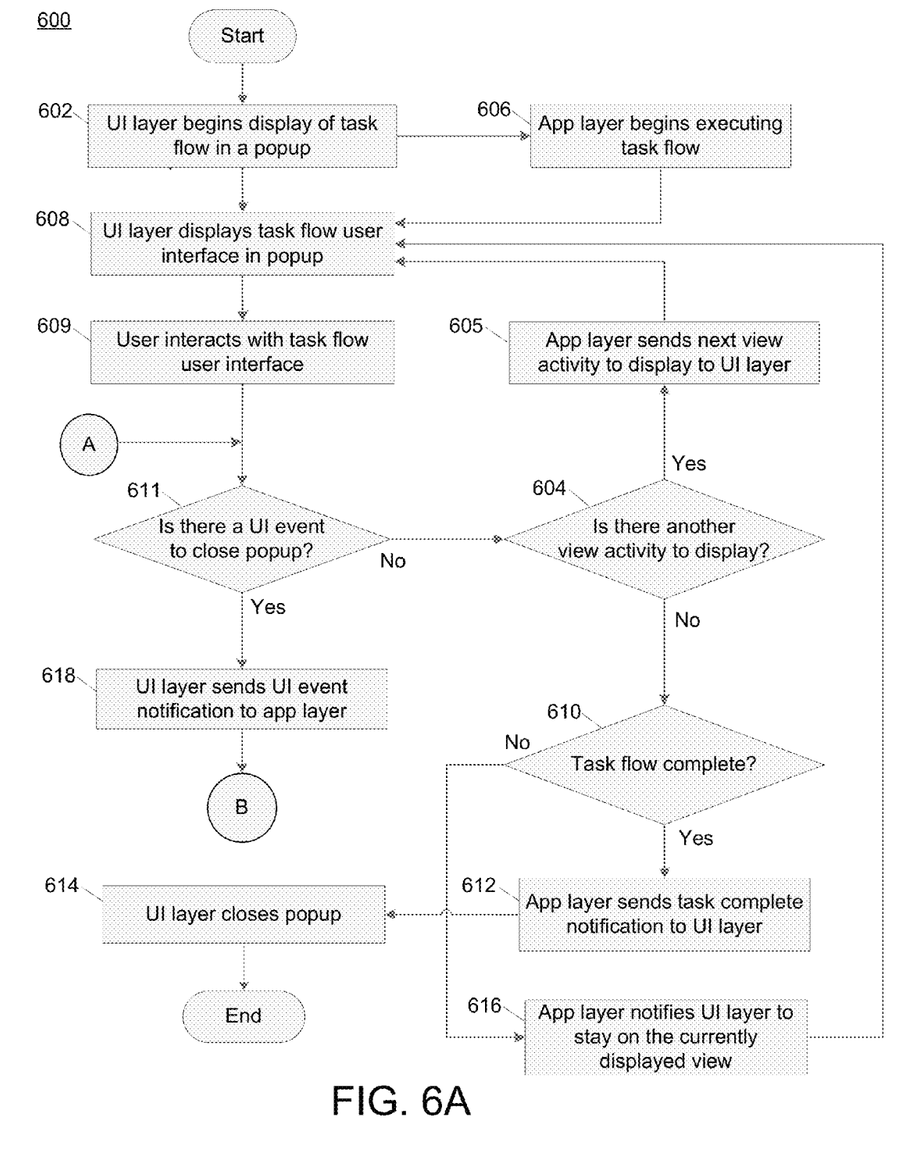
FIGS. 6A and 6B are simplified flow diagrams illustrating a method of presenting a task flow, which is executed in an application layer, in a component of an application user interface, which is in a user interface layer according to an embodiment.
Figure 6B:
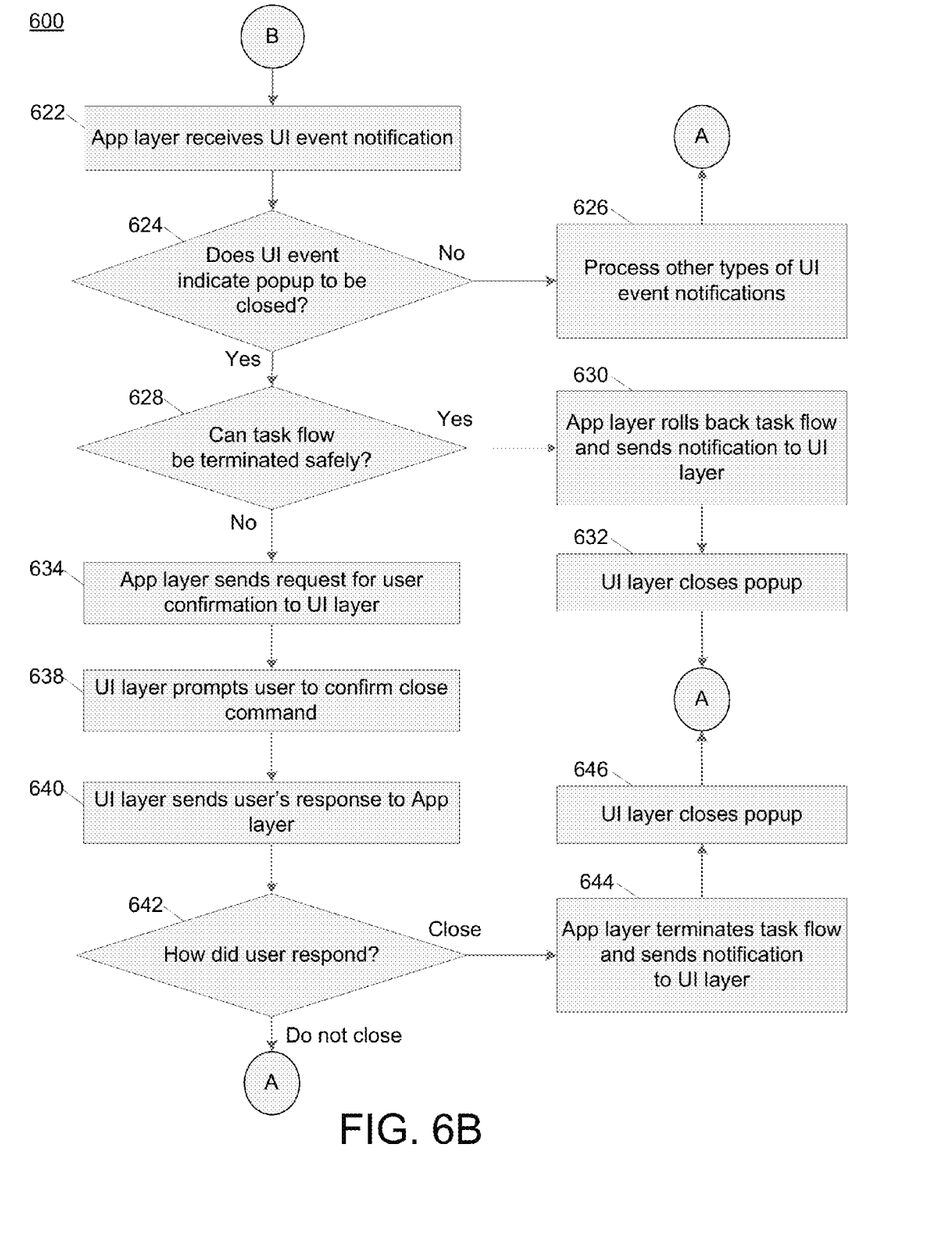

FIGS. 6A and 6B are simplified flow diagrams illustrating a method 600 of presenting a task flow, which is executed in an application layer, in a component of an application user interface, which is in a user interface layer according to an embodiment. The processing depicted in FIGS. 6A and 6B may be performed by software (executed by a processor), hardware, or combinations thereof. In one embodiment, the process of FIG. 6A is invoked when a task flow is executed by an application server. At block 602, the user interface layer begins to display the popup and the region containing the task flow, and the user interface layer initiates a request to the application layer to start, i.e., activate, the task flow. In one or more embodiments, the communication between the user interface and application layers is loosely coupled, e.g., the application layer sends an event to the user interface layer to notify the user interface layer of a task flow completion. Specific components of the user interface layer that are interested in this event take the appropriate steps to respond to the event. For example, the popup running a region with a task flow can close itself and return control to the calling page/view activity. In one or more embodiments, the user interface layer components do not have knowledge of (i.e., information about) task flows or other specific business application layer objects. Communication between the layers is via a generic model object, and a task flow, which is a kind of a region model object, responds to user interface events in a way that is specific and relevant to the task flow. For example, the task flow can release resources, roll back transactions, and the like. Thus, in other embodiments, other implementations of a region model object can perform different actions in response to a close popup event. The ADF task flow is an example of a specific type of a business flow that can be rendered using a region component.

The application layer receives the request to start the task flow and begins executing the task flow at block 606. Block 606 communicates the appropriate information to the user interface (i.e., view) layer so that the user interface layer can display the task flow user interface in the popup at block 608. For example, at block 608 the application layer may send instructions to the user interface layer to display particular pages in the task flow when those pages are reached in the execution of the task flow. At block 609, the user interacts with the task flow user interface, e.g., by performing an action in the user interface. The application layer may also receive input from the user interface layer, such as data values entered by the user in the application user interface. At block 611, the user interface layer determines if there is a user interface event to close the popup. If so, the user interface layer sends a user interface event notification to the application layer at block 618, and execution continues at point B of FIG. 6B. If block 611 determines that there is no user interface event to close the popup, then the user interface layer communicates the fact that there has been a user interaction to block 604. Block 604 processes the next user action to determine the next course of action to take. For example, the next activity to transition to will be determined by the task flow based on the action chosen by the user.

Block 604 determines if there is another view activity to display, e.g., if another view activity is to be executed in the task flow. If so, at block 605 the application layer sends an identification of the next view activity to be displayed to the user interface layer, which receives the identification of the next view activity at block 608, at which point execution continues in the user interface layer as previously described. Otherwise, if block 604 determines that there is not another view activity to display, then at block 610 the application layer determines if the task flow has completed. Block 610 checks if the task flow is complete, e.g., if the end of the task has been reached and there is no further processing to be done by the task, or if the task has terminated at any point in its execution for some other reason, such as an error condition, a system shutdown, or the like. If the task is complete or terminated, the application layer sends a task complete notification to the user interface layer at block 612, the user interface layer receives the notification at block 614 and closes the popup, and the method ends. Block 614 may close additional inline popups, for example, if there are additional task flows executing. In one example, if there is a bounded taskflow running in a first inline popup, and user has launched a second taskflow in a second inline popup, if for some reason the application terminates the primary bounded taskflow (or the secondary bounded task flow), then block 614 closes both the first and second inline popups. Otherwise, if block 610 determines that the task flow is not complete, then at block 616 the application layer notifies the user interface layer to stay on the same view currently being displayed, and the application layer continues execution at block 608 by displaying the task flow user interface in the popup.

Referring to FIG. 6B, the application layer receives the UI event notification from the user interface layer at block 622. The application layer then checks if the UI event indicates that the popup is to be closed at block 624. A popup close event may occur in response to a user clicking a close button on a popup or on a window containing the popup, or in other situations that cause the popup to be closed. If not, the UI event may refer to a different user interface component, or a different type of event related to the popup (e.g., refreshed or minimized), and block 626 processes such different types of components and/or events. Control then returns to point A in FIG. 6A (i.e., block 611) to check for more events to process. Otherwise, if block 624 determines that the UI event indicates that the popup is to be closed, then block 628 determines if the task flow can be terminated safely, e.g., without losing data or causing an inconsistent application state. The decision of whether the task flow can be terminated safely is dependent upon the application, so the application layer may interact with implementation code of the application to determine the result of block 628. The task flow and application may be in a state, such as a transaction, in which a rollback is possible, in which case block 628 determines that the task flow can be terminated safely. In other cases, the application and task flow may be in a state in which data will be lost if the task flow is terminated, in which case block 628 determines that the application cannot or should not be rolled back. If block 628 determines that the application can be rolled back, then the application layer rolls back the task flow and sends a corresponding notification to the user interface layer at block 630, and the user interface layer closes the popup at block 632, and execution continues at point A of FIG. 6A. Otherwise, if block 628 determines that the application cannot be rolled back, control transfers to block 634, in which the application layer requests that the user interface layer confirm that the popup is to be closed even though data may be lost. The application layer sends a request for user confirmation to the UI layer at block 634, and at block 638 the UI layer prompts the user to confirm the close command even though data may be lost. The user interface layer receives the user's response, e.g., an indication of whether the popup can be closed, at block 640. If the user indicates that the popup can be closed, block 642 transfers control to block 644, in which the application layer terminates the task flow and sends a task ended notification back to the user interface layer. Block 646 closes the popup and transfers control back to point A of FIG. 6A. Otherwise, if the user indicates that the popup cannot be closed, then block 642 transfers control to point A of FIG. 6A, and the method continues to wait for and process events at block 610.

In one or more embodiments, the blocks in the flow diagrams of FIGS. 6A and 6B are performed by the user interface ("UI") layer and/or by a user interface portion of the application provided by a developer, and/or by the application ("App") layer or an implementation portion of the application provided by a developer, although other portions of the process execution system 100 may perform one or more of the actions shown in the flowcharts, or may perform actions that implement the actions shown in the flowcharts.

Figure 7:
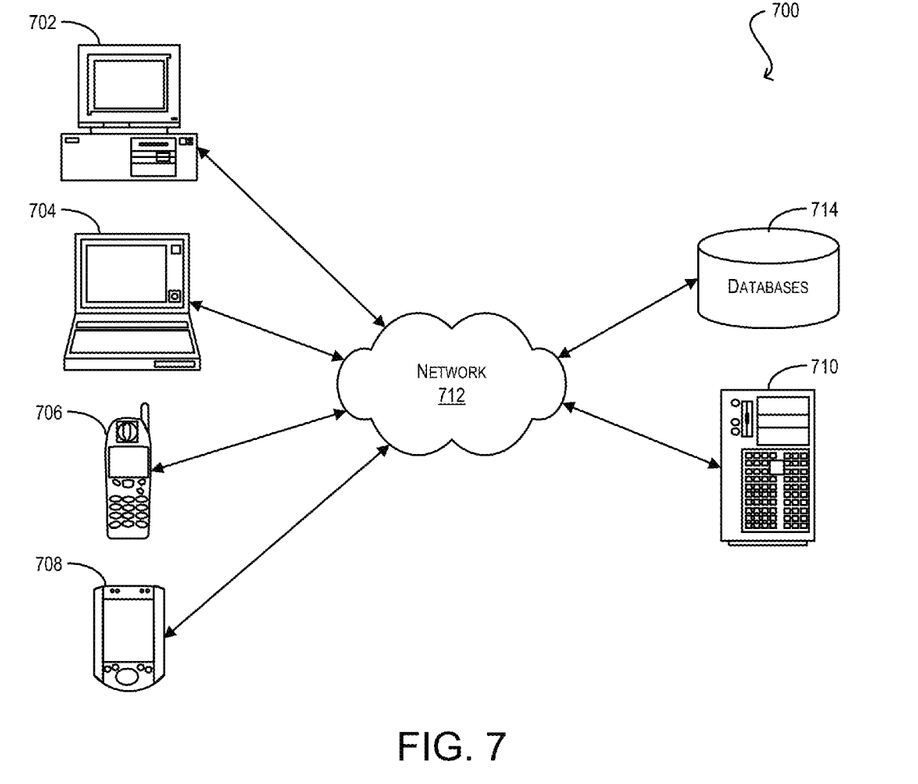
FIG. 7 is a simplified block diagram illustrating a system environment that can be used in accordance with an embodiment of the present invention.

FIG. 7 is a simplified block diagram illustrating a system environment 700 that can be used in accordance with an embodiment of the present invention. As shown, system environment 700 can include one or more client computing devices 702, 704, 706, 708, which can be configured to operate a client application such as a web browser, a UNIX/Solaris terminal application, and/or the like. Client computing devices 702, 704, 706, 708 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, 708 can be any other electronic device capable of communicating over a network, such as network 712 described below. Although system environment 700 is shown with four client computing devices, it should be appreciated that any number of client computing devices can be supported. In various embodiments, client computing devices 702, 704, 706, 708 can correspond to client 102 of FIG. 1, and can be operated by one or more users to interact with the application user interface 106, the user interface layer 108, and the integrated development environment 130.

System environment 700 can further include a network 712. Network 712 can be any type of network familiar to those skilled in the art that can support data communications using a network protocol, such as TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 can further include one or more server computers 710 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 710 can run an operating system including any of those discussed above, as well as any commercially available server operating system. Server 710 can also run any of a variety of server applications and/or mid-tier applications, including web servers, FTP servers, CGI servers, Java virtual machines, and the like. In one set of embodiments, server 710 can correspond to server 110 of FIG. 1.

System environment 700 can further include one or more databases 714. In one set of embodiments, databases 714 can include databases that are managed by server 710. Databases 714 can reside in a variety of locations. By way of example, databases 714 can reside on a storage medium local to (and/or resident in) one or more of computers 702, 704, 706, 708, and 710. Alternatively, databases 714 can be remote from any or all of computers 702, 704, 706, 708, and 710, and/or in communication (e.g., via network 712) with one or more of these. In one set of embodiments, databases 714 can reside in a storage-area network (SAN) familiar to those skilled in the art.

Figure 8:
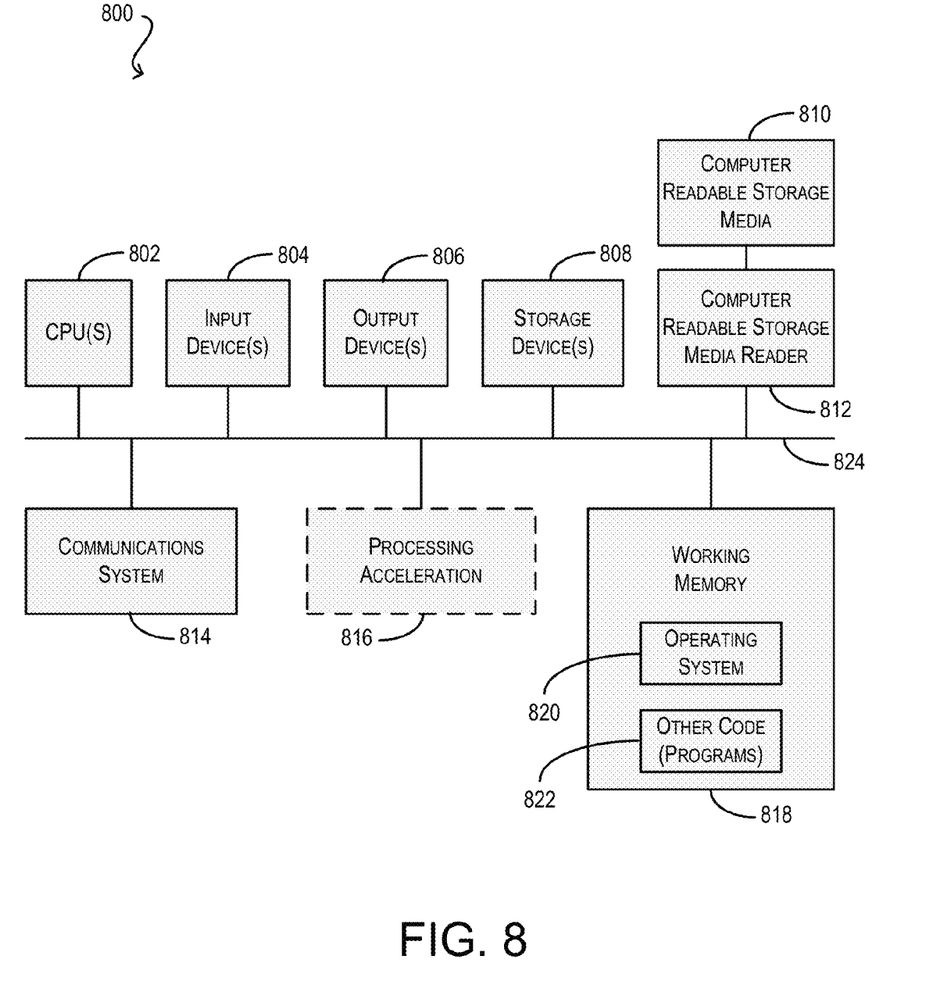
FIG. 8 is a simplified block diagram illustrating a computer system that can be used in accordance with an embodiment of the present invention.

FIG. 8 is a simplified block diagram illustrating a computer system 800 that can be used in accordance with an embodiment of the present invention. In various embodiments, computer system 800 can be used to implement any of computers 702, 704, 706, 708, and 710 described with respect to system environment 700 above. As shown, computer system 800 can include hardware elements that are electrically coupled via a bus 824. The hardware elements can include one or more central processing units (CPUs) 802, one or more input devices 804 (e.g., a mouse, a keyboard, etc.), and one or more output devices 806 (e.g., a display device, a printer, etc.). Computer system 800 can also include one or more storage devices 808. By way of example, the storage device(s) 808 can include devices such as disk drives, optical storage devices, and solid-state storage devices such as a random access memory (RAM) and/or a read-only memory (ROM), which can be programmable, flash-updateable and/or the like.

Computer system 800 can additionally include a computer-readable storage media reader 812, a communications subsystem 814 (e.g., a modem, a network card (wireless or wired), an infra-red communication device, etc.), and working memory 818, which can include RAM and ROM devices as described above. In some embodiments, computer system 800 can also include a processing acceleration unit 816, which can include a digital signal processor (DSP), a special-purpose processor, and/or the like.

Computer-readable storage media reader 812 can be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 can permit data to be exchanged with network 712 and/or any other computer described above with respect to system environment 700.

Computer system 800 can also comprise software elements, shown as being currently located within working memory 818, including an operating system 820 and/or other code 822, such as an application program (which may be a client application, Web browser, middle tier/server application, etc.). It should be appreciated that alternative embodiments of computer system 800 can have numerous variations from that described above. For example, customized hardware can be used and particular elements can be implemented in hardware, software, or both. Further, connection to other computing devices such as network input/output devices can be employed.

Computer readable storage media 810 for containing code, or portions of code, executable by computer system 800 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
   at a server computer having one or more hardware processors and a memory storing a first library that includes code shared by one or more different applications to implement application logic:
   receiving information that defines a plurality of tasks to be executed at runtime using the first library by the one or more processors as an application, each task in the plurality of tasks in an ordered sequence as a task flow, wherein at least one task comprises a view activity that includes one or more user interface components of a second library that includes code shared by one or more applications to implement user interfaces;
   receiving a request generated by a client device to initiate the task flow, the request triggered in response to a user interface of the client device instantiating a popup within a window of the user interface using the second library;
   determining that a first task in the plurality of tasks comprises a view activity in response to executing the task flow;
   sending a first message to the user interface of the client device instructing the user interface to present one or more user interface components of the first task within a region of the popup;
   determining that a second task in the plurality of tasks comprises a view activity in response to executing the task flow;
   sending a second message to the user interface of the client device instructing the user interface to update the region of the user interface with one or more user interface components of the second task without user intervention;
   receiving from the client device a user interface event generated by the user interface that indicates a request to close the popup;
   executing an action in response to receiving the user interface event, wherein executing the action comprises sending a third message to the user interface of the client device instructing the user interface to update the region of the popup with a confirmation dialog indicating uncommitted transaction data;
   receiving a user response to the confirmation dialog, wherein the user response indicates that the uncommitted transaction data is to be saved;
   causing the uncommitted data to be saved in response to the user response; and
   rolling back and terminating at least one transaction associated with the task flow.

2. The method of claim 1, wherein sending the second message to the user interface of the client device comprises sending a message to the user interface for closing the popup.

3. The method of claim 1, wherein receiving the request generated by the client device to initiate the task flow is triggered by the user interface to overlay a second popup, the method further comprising:
   receiving information that defines a second plurality of tasks to be executed at runtime in an ordered sequence as a second task flow; and
   determining that a first task in the second plurality of tasks comprises a view activity in response to executing the second task flow.

4. The method of claim 3, wherein sending the first message to the user interface of the client device comprises instructing the user interface to display the second popup in the region of the popup.

5. The method of claim 1, wherein the task flow is a bounded task flow having defined start and end portions.

6. The method of claim 1, wherein the one or more user interface components of the first task include one or more page fragments and the first message to the user interface of the client device comprises generating an instruction for rendering the one or more page fragments in the region.

7. The method of claim 1, wherein executing the action further comprises releasing one or more resources associated with the at least one transaction.

8. A system comprising:
   a processor; and
   a memory storing a first library that includes code shared by one or more different applications to implement application logic and configured to store a set of instructions which when executed by the processor configured the processor to:
   receive information that defines a plurality of tasks to be executed at runtime using the first library by the one or more processors as an application, each task in the plurality of tasks in an ordered sequence as a task flow, wherein at least one task comprises a view activity that includes one or more user interface components of a second library that includes code shared by one or more applications to implement user interfaces;

receive a request generated by a client device to initiate the task flow, the request triggered in response to a user interface of the client device instantiating a popup within a window of the user interface using the second library;

determine that a first task in the plurality of tasks comprises a view activity in response to executing the task flow;

send a first message to the user interface of the client device instructing the user interface to present one or more user interface components of the first task within a region of the popup;

determine that a second task in the plurality of tasks comprises a view activity in response to executing the task flow;

send a second message to the user interface of the client device instructing the user interface to update the region of the user interface with one or more user interface components of the second task without user intervention;

receive from the client device a user interface event generated by the user interface that indicates a request to close the popup;

execute an action in response to receiving the user interface event, wherein executing the action comprises sending a third message to the user interface of the client device instructing the user interface to update the region of the popup with a confirmation dialog indicating uncommitted transaction data;

receive a user response to the confirmation dialog, wherein the user response indicates that the uncommitted transaction data is to be saved;

cause the uncommitted data to be saved in response to the user response; and roll back and terminate at least one transaction associated with the task flow.

9. The system of claim 8, wherein to receive the request generated by the client device to initiate the task flow the processor is configured to receive a request triggered by the user interface to overlay a second popup, and the processor is further configured to:

receive information that defines a second plurality of tasks to be executed at runtime in an ordered sequence as a second task flow; and determine that a first task in the second plurality of tasks comprises a view activity in response to executing the second task flow.

10. The system of claim 9, wherein to send the first message to the user interface of the client device the processor is further configured to instruct the user interface to display the second popup in the region of the popup.

11. The system of claim 8, wherein the one or more user interface components of the first task include one or more page fragments.

12. The system of claim 8, wherein the action further comprises releasing one or more resources associated with the at least one transaction.

13. A non-transitory machine-readable medium having stored thereon a first library that includes code shared by one or more different applications to implement application logic and a set of instructions which when executed by a processor of a computer system cause the processor to:

receive information that defines a plurality of tasks to be executed at runtime using the first library by the one or more processors as an application, each task in the plurality of tasks in an ordered sequence as a task flow, wherein at least one task comprises a view activity that includes one or more user interface components of a second library that includes code shared by one or more applications to implement user interfaces;

receive a request generated by a client device to initiate the task flow, the request triggered in response to a user interface of the client device instantiating a popup within a window of the user interface using the second library;

determine that a first task in the plurality of tasks comprises a view activity in response to executing the task flow;

send a first message to the user interface of the client device instructing the user interface to present one or more user interface components of the first task within a region of the popup;

determine that a second task in the plurality of tasks comprises a view activity in response to executing the task flow;

send a second message to the user interface of the client device instructing the user interface to update the region of the user interface with one or more user interface components of the second task without user intervention;

receive from the client device a user interface event generated by the user interface that indicates a request to close the popup;

execute an action in response to receiving the user interface event, wherein executing the action comprises sending a third message to the user interface of the client device instructing the user interface to update the region of the popup with a confirmation dialog indicating uncommitted transaction data;

receive a user response to the confirmation dialog, wherein the user response indicates that the uncommitted transaction data is to be saved;

cause the uncommitted data to be saved in response to the user response; and roll back and terminate at least one transaction associated with the task flow.

14. The machine-readable medium of claim 13, to send a second message to the user interface the set of instructions cause the processor to send a message for closing the popup.

15. The machine-readable medium of claim 14, wherein to receive the request generated by the client device to initiate the task flow the set of instructions cause the processor to receive a request triggered by the user interface to overlay a second popup, the set of instructions further causing the processor to:

receive information that defines a second plurality of tasks to be executed at runtime in an ordered sequence as a second task flow; and determine that a first task in the second plurality of tasks comprises a view activity in response to executing the second task flow.

16. The machine-readable medium of claim 15, wherein to send the first message to the user interface of the client device the set of instructions cause the processor to instruct the user interface to display the second popup in the region of the popup.

* * * * *